United States Patent Office
3,054,779
Patented Sept. 18, 1962

3,054,779
PARA HYDROXY ALKYL AROMATIC CARBOXYLIC ACIDS AND POLYMERS THEREOF
Donald D. Wheeler, Midland, Mich., assignor to The Dow Chemical Company, Midland, Mich., a corporation of Delaware
No Drawing. Filed Mar. 24, 1959, Ser. No. 801,462
8 Claims. (Cl. 260—78.3)

This invention relates to the production of polymerizable hydroxy aromatic and hydroxyl alkyl aromatic acids and to the polymers derived therefrom and, in particular, it is concerned with a process for the production of parahydroxy alkyl phenyl carboxylic acids and their polymerization products.

For the preparation of certain kinds of polymers and particularly crystalline fiber-forming super polyesters certain orientation of functional groups in molecules is required. In general with respect to super polyester compounds an orientation in which the acid function is in an extreme spatial relationship to the hydroxyalkyl function is desirable. In this way, internal rearrangements within the molecule are avoided and formation of linear polymers of extreme high molecular weights becomes possible.

It is, accordingly, a fundamental object of this invention to provide a process for the preparation of parahydroxyalkyl organic acids which compounds are ideally suited for the preparation of such crystalline fiber forming super polyesters.

Other objects and advantages of the invention will in part be obvious and in part appear hereinafter.

The invention, accordingly, is involved in the preparation of para-hydroxyalkylphenyl carboxylic acids, for example, in the preparation of para-hydroxymethylphenyl acetic acid by reaction of para-halo-alkylphenyl hydrocarbons with a limited amount of alkali metal acetate to form the para-halo-alkylbenzyl acetate and thereafter hydrolyzing to the hydroxyalkyl compound, which reactions may be illustrated essentially as follows when applied to para-hydroxymethylphenyl acetic acid.

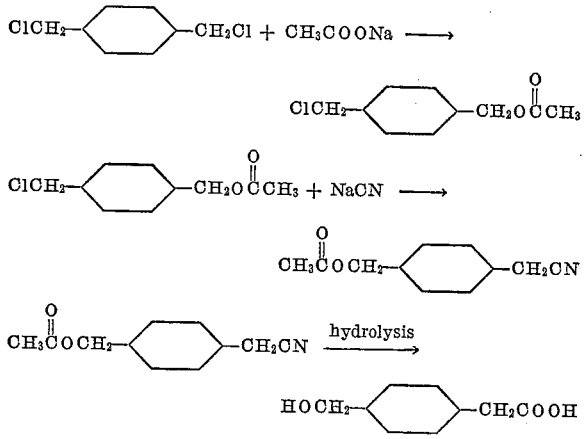

The specific compounds which may be prepared in accordance with this process and this sequence of reactions are the para-hydroxyalkyl, phenyl organic acids which thereby give compounds of the following general formula:

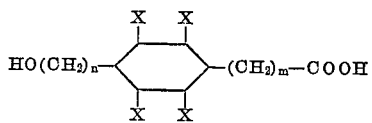

and fiber-forming polymers thereof the repeating unit of which has the formula:

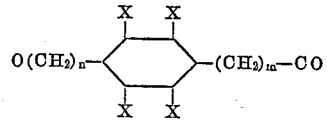

wherein $n$ and $m$ are integers from 1 to 4, X may be H, $CH_3$ or Cl.

Formation of polymers of the compounds is carried out through a simple heating operation which results in the removal of water or internally esterifying so that a compound characterized by its linear form having phenyl groups regularly placed therein is produced directly.

It is of interest also to note that the presence of additional alkyl substituents on the phenyl group will be useful and have some effect on the modification of the physical properties of the compounds but will not affect the basic principle of the invention.

Ortho-hydroxymethylphenylacetic acid and the meta compound are reported in chemical literature and the methods of preparation are also known. See, for example, Murahashi, Institute of Physical and Chemical Research, Scientific Papers (Tokyo), 30, 180–194 (1936); Gough et al., Jour. Chem. Soc., 115, 1155–64 (1919).

Polymers formed from para-hydroxymethylphenylacetic acid are unknown and have the remarkable advantage of offering a simple essentially linear molecular structure which can be made virtually of any molecular weight desired. In contrast to the para isomer it should be noted that the meta compound would not give a linear crystalline fiber-forming polymer whereas the ortho compound would react internally to give an internal lactone under polymerization conditions.

The method of preparation of the compounds, that is the fundamental starting compounds and the polymers, in accordance with this invention, is better understood by reference to the following specific example:

A solution of 875 grams (5.0 moles) of $\alpha,\alpha'$-dichloro-p-xylene in 1 liter of acetic acid was stirred and heated to 130° C. while 513 grams (6.25 moles) of sodium acetate was added over a 1-hour period. The resulting mixture was stirred and refluxed (130° C.) for an additional two hours and then cooled. The solid (salt) was filtered out and washed with acetic acid. The filtrate was heated and the acetic acid distilled. The residue was fractionally distilled through a 2′ Berl saddle packed column and the following materials separated:

184 grams (21% recovery) $\alpha,\alpha'$-dichloro-p-xylene, B.P. 141–158° C./20 mm.

375 grams (38%) p-(chloromethyl)benzyl acetate, B.P. 162–172° C./20 mm.

328 grams (30%) $\alpha,\alpha'$-p-xylenediol diacetate, B.P. 185–188° C./20 mm.

It is noted that under the conditions of reaction, a significant amount of the diacetate is produced, but it is readily separated.

A solution of 98 grams (2.0 moles) of sodium cyanide, 300 milliliter, 2B ethanol and 200 milliliters of water was stirred and heated to 70° C. while 199 grams (1.0 mole) of p-(chloromethyl)benzyl acetate was added dropwise over a 2-hour period. The dark mixture was stirred and heated to 70–80° C. for an additional four hours and then cooled. Organic materials were taken up in benzene, the benzene solution washed twice with water, heated and the benzene-water azeotrope and excess benzene distilled. The residue was distilled through a 2′ Berl saddle packed column and the following materials separated:

68.5 grams (36%) p-(acetoxymethyl)phenylacetonitrile, B.P. 152–160° C./3 mm.

37.5 grams (25%) p-(hydroxymethyl)phenylacetonitrile, B.P. 161–163° C./3 mm.

A solution of 68.5 grams (0.37) mole of p-(acetoxymethyl)phenylacetonitrile, 200 milliliters of 2B ethanol and 200 milliliters of 5 N sodium hydroxide was heated to boiling on the steam bath for three hours. The solution was cooled and acidified with concentrated sulfuric acid. The precipitate which formed was collected by filtration and dried. Weight of p-(hydroxymethyl)phenylacetic acid was 58 grams (95%), melting point 124–6° C. Technical p - (hydroxymethyl)phenylacetic acid (48 grams) was recrystallized twice from 150 milliliters of water to give the pure p-(hydroxymethyl)-phenylacetic acid melting point 128.5–129° C. (34 grams).

A trace of zinc borate was mixed with 7 grams of pure p-(hydroxymethyl) phenylacetic acid and the mixture heated to 130° C. where a clear melt was formed. A slow stream of nitrogen was bubbled through the melt while it was held at 150° C. for two hours. The melt was then heated to 175° C. for 15.5 hours and finally at 200° C. for four hours. A viscous clear liquid was present at this time. On cooling, a tough opaque solid was obtained. It melted at 182–190° C. Fibers which were drawn from the melt could be cold drawn approximately 400% and knotted without breaking. The drawn fibers were relatively inert toward acid hydrolysis. A 0.5% solution of the polymer in m-cresol had a relative viscosity of 1.191.

The polymerization reaction obtained in this heating results from a dehydration reaction with esterification of the functional groups and is postulated as follows:

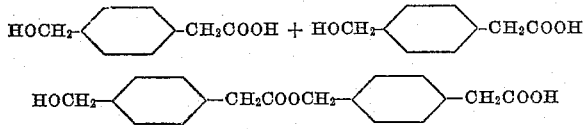

Further polymerization to trimer, etc. is possible because the functional group at each end of the molecule is available for reaction.

It is also quite apparent that alkyl or chlorine groups carried by the phenyl ring do not enter the reaction and have the effect merely of altering molecular weight and melting point of the product. Thus the process is directly applicable to the production of polymers of parahydroxyalkyl - aromatic - carboxylic acids, and polymers, e.g.

(1) 4 - hydroxymethyl - 2,3,5,6 - tetramethylphenylacetic acid, M.P. 203.5–204.0° C.
(2) Poly(4 - hydroxymethyl - 2,3,5,6 - tetramethylphenylacetic acid), M.P. 325–7° C. (dec.).
(3) 4 - hydroxymethyl - 2,5 - dimethylphenylacetic acid, M.P. 130.5–131.5° C.
(4) Poly(4 - hydroxymethyl - 2,5 - dimethylphenylacetic acid), M.P. 220–222° C.
(5) 4-hydroxymethyl-2-methylphenylacetic acid and the polymer derived from it.
(6) 2,5-dichloro-4-hydroxymethylphenylacetic acid and the derived polymer.
(7) 5-chloro-4-hydroxymethyl-2-methylphenylacetic acid and the derived polymer.

The polymers, as indicated, are formed by heating, which induces internal esterification. The degree of polymerization is directly measurable by determining the amount of water removed in the heating. Polymerization to the extent of 100 times the monomer unit is readily accomplished.

Though the invention has been described in terms of only a limited number of examples, it is to be understood that variants thereof may be developed without departing from its spirit or scope.

What is claimed is:

1. A chemical compound from the group consisting of those having a formula given by the following:

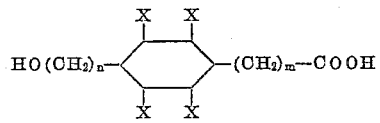

and polymers thereof, extending up to substantially more than 100 monomer units, wherein $n$ and $m$ are integers in the range from 1–4, X is selected from the group consisting of H, —$CH_3$, and Cl.

2. The new compound—4-hydroxymethyl-2,3,5,6-tetramethylphenylacetic acid.
3. The new compound—poly(4-hydroxymethyl-2,3,5,6-tetramethylphenylacetic acid).
4. The new compound—4-hydroxymethyl-2,5-dimethylphenylacetic acid.
5. The new compound—poly(4-hydroxymethyl-2,5-dimethylphenylacetic acid).
6. 4-hydroxymethyl-2-methylphenylacetic acid.
7. 2,5-dichloro-4-hydroxymethylphenylacetic acid.
8. 5 - chloro - 4 - hydroxymethyl - 2 - methylphenylacetic acid.

References Cited in the file of this patent
UNITED STATES PATENTS 2,471,023    Cook et al. _____ May 24, 1949

OTHER REFERENCES

Gough et al.: Journal Chem. Society, vol. 115, pp. 1155–64 (1919). (Copies in Sci. Libr.)

Murahashi: Institute of Physical and Chemical Research, Scientific Papers (Tokyo), vol. 30, pp. 180–194 (1936).